(12) United States Patent
Grigorjew

(10) Patent No.: US 12,152,696 B2
(45) Date of Patent: Nov. 26, 2024

(54) EXPANSION SLEEVE APPARATUS AND METHOD FOR FLOW CONTROL VALVE

(71) Applicant: Honeywell International Inc., Morris Plains, NJ (US)

(72) Inventor: Igor Grigorjew, Kassel (DE)

(73) Assignee: Honeywell International Inc., Charlotte, NC (US)

( * ) Notice: Subject to any disclaimer, the term of this patent is extended or adjusted under 35 U.S.C. 154(b) by 362 days.

(21) Appl. No.: 17/026,182

(22) Filed: Sep. 19, 2020

(65) Prior Publication Data

US 2021/0381622 A1    Dec. 9, 2021

Related U.S. Application Data

(60) Provisional application No. 63/036,185, filed on Jun. 8, 2020.

(51) Int. Cl.

| | |
|---|---|
| *F16K 47/02* | (2006.01) |
| *F16K 27/04* | (2006.01) |
| *F16K 1/12* | (2006.01) |
| *F16K 3/24* | (2006.01) |
| *F16K 47/08* | (2006.01) |

(52) U.S. Cl.
CPC ............ *F16K 47/02* (2013.01); *F16K 27/041* (2013.01); *F16K 1/123* (2013.01); *F16K 3/24* (2013.01); *F16K 47/08* (2013.01)

(58) Field of Classification Search
CPC ........ F16K 47/02; F16K 27/041; F16K 1/123; F16K 3/24; F16K 47/08
See application file for complete search history.

(56) References Cited

U.S. PATENT DOCUMENTS

| | | | |
|---|---|---|---|
| 3,990,475 A | | 11/1976 | Myers |
| 4,161,967 A | | 7/1979 | Sprague |
| 4,402,485 A | * | 9/1983 | Fagerlund ......... F16L 55/02763 181/254 |
| 5,161,576 A | * | 11/1992 | Hekkert .................. F16K 47/02 137/625.38 |
| 5,261,453 A | * | 11/1993 | Hekkert .................. F16K 47/08 137/625.34 |

(Continued)

FOREIGN PATENT DOCUMENTS

| | | |
|---|---|---|
| CN | 201687947 U | 12/2010 |
| CN | 102840366 A | 12/2012 |

(Continued)

OTHER PUBLICATIONS

European search Report for corresponding EP Application No. 21196155.2.

(Continued)

*Primary Examiner* — Matthew W Jellett
*Assistant Examiner* — Christopher D Ballman
(74) *Attorney, Agent, or Firm* — Ortiz & Lopez, PLLC; Luis M. Ortiz; Kermit D. Lopez

(57) ABSTRACT

An expansion sleeve apparatus comprising one or more layers configured from a material having a scalable volumetric porosity and enhanced noise reduction properties, wherein the expansion sleeve surrounds a flow control valve that is operable with a bidirectional flow of fluid through the flow control valve.

17 Claims, 4 Drawing Sheets

(56) References Cited

U.S. PATENT DOCUMENTS

| | | | | |
|---|---|---|---|---|
| 6,783,110 | B2* | 8/2004 | Hirota | F16K 1/123 |
| | | | | 251/129.08 |
| 6,968,923 | B2* | 11/2005 | Schmaeman | F01N 1/087 |
| | | | | 239/397.5 |
| 8,800,599 | B2* | 8/2014 | Betting | B01D 17/0217 |
| | | | | 137/219 |
| 9,625,055 | B2* | 4/2017 | Ter Haar | F16K 47/08 |
| 10,094,489 | B2 | 10/2018 | Freitas et al. | |
| 10,704,720 | B2 | 7/2020 | Lee | |
| 2003/0196698 | A1 | 10/2003 | Lin et al. | |
| 2007/0017584 | A1* | 1/2007 | Shea | F16K 47/08 |
| | | | | 137/625.3 |
| 2019/0160551 | A1 | 5/2019 | Frota de Souza | |

FOREIGN PATENT DOCUMENTS

| | | |
|---|---|---|
| CN | 202852181 U | 3/2013 |
| GB | 2459720 A | 3/2012 |
| JP | 2009052622 A | 3/2009 |

OTHER PUBLICATIONS

Flow control valve HON 530-E-WG DN 500/500, Honeywell International Inc, 2017.

* cited by examiner

EXPANSION SLEEVE APPARATUS AND METHOD FOR FLOW CONTROL VALVE

TECHNICAL FIELD

Embodiments relate to industrial process control in manufacturing and processing facilities. Embodiments also relate to the regulation and control of fluid flow in manufacturing and processing facilities. Embodiments further relate to flow control valves utilized in industrial process control applications. Embodiments additionally relate to an expansion sleeve apparatus used in flow control valve applications.

BACKGROUND

Industrial process control at manufacturing plants includes the use of a flow control valve (also referred to as a pressure reduction valve) for the regulation and control of the flow of fluid/gas. A control signal (e.g., pneumatic or electronic) can manipulate the flow control valve and position it to enable accurate control of fluid flow for achieving production requirements, while reducing unnecessary costs. This predictable process variable control can form a part of a control loops, for instance, in a production operation. The flow control valve can be designed to withstand harsh conditions, and used in, for example, oil and gas, power, petrochemical, steel and other manufacturing and industrial applications.

Flow control valves used in industrial process control applications may emit a strong acoustic noise that can disturb the environment and create problems in the manufacturing or industrial operation. That is, the acoustic noise generated can impact other components and devices in a manufacturing plant along with affecting the human operators at the plant.

Typically, flow conditioners and noise filters may be used between a flow control valve and a meter to both block the line of sight of noise travelling with the fluid and also effectively absorb them. This approach, however, can introduce additional and unwanted pressure drop in the flow. Some approaches to noise filtering that have been implemented involve the implementation of a silencer expansion sleeve. These devices typically can be constructed with three or more layers, which may be helpful in facilitating noise reduction. This approach, however, is very expensive and not always optimal for customer site conditions, particularly in facilities with multiple flow control valves.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for an expansion sleeve apparatus for use in flow control valve applications.

It is another aspect of the disclosed embodiments to provide for an expansion sleeve apparatus with inbuilt noise reduction properties for use in flow control valve applications.

It is a further aspect of the disclosed embodiments to provide for an expansion sleeve apparatus that provides for a scalable porosity and which can be configured based on a calculation of a KG-value (i.e., the capacity of the valve) according to user conditions.

It is yet another aspect of the disclosed embodiments to provide for a volumetric expansion sleeve.

The aforementioned aspects and other objectives can now be achieved as described herein.

In an embodiment, an expansion sleeve apparatus can comprise at least one layer configured from a material having a scalable volumetric porosity and enhanced noise reduction properties, wherein the expansion sleeve surrounds a flow control valve that is operable with a bidirectional flow of fluid through the flow control valve.

In an embodiment, the material can comprise metal foam.

In an embodiment, the material can comprise a metal with scalable volumetric porosity.

In an embodiment, the expansion sleeve can be configured with a plurality of grooves.

In an embodiment, the expansion sleeve can be configured based on a determination of a capacity of the flow control valve.

In an embodiment, the expansion sleeve can be operable based on a determination of a capacity of the flow control valve.

In an embodiment, the expansion sleeve can be installed in the flow control valve.

In an embodiment, a flow control valve apparatus can include a flow control valve operable with a bidirectional flow of fluid through the flow control valve, and an expansion sleeve associated with the flow control valve, wherein the expansion sleeve includes at least one layer configured from a material having a scalable volumetric porosity and enhanced noise reduction properties, wherein the expansion sleeve surrounds the flow control valve that is operable with the bidirectional flow of fluid through the flow control valve.

In an embodiment, a method of operating a flow control valve, can involve operating a flow control valve with a bidirectional flow of fluid through the flow control valve, the flow control valve associated with an expansion sleeve comprising at least one layer configured from a material having a scalable volumetric porosity and enhanced noise reduction properties, wherein the expansion sleeve surrounds the flow control valve.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
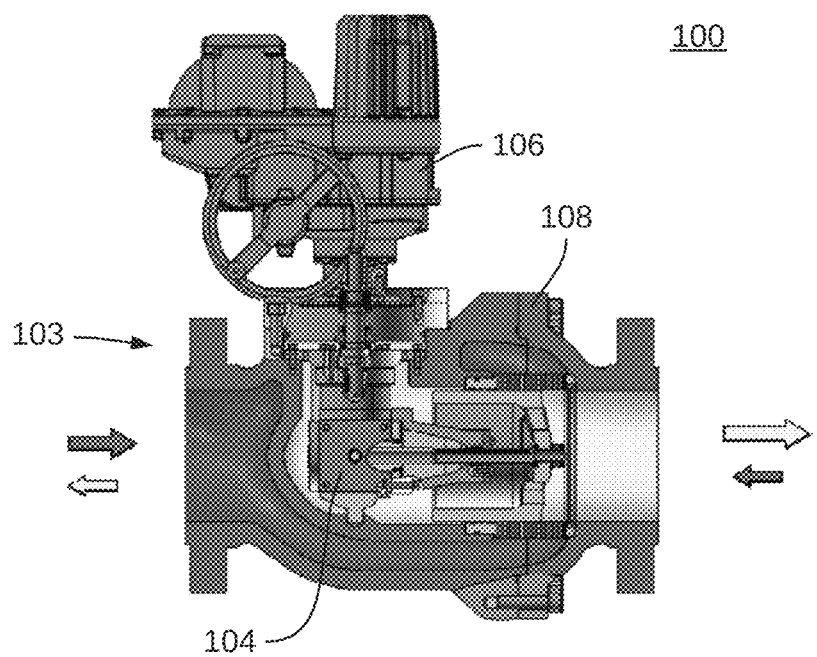
FIG. 1 illustrates a side-sectional cut-away view of a flow control valve apparatus, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As discussed earlier flow control valves used in industrial process control applications may emit strong acoustic noise and vibrations that can disturb the environment and create problems in manufacturing or industrial operations. Flow conditioners and noise filters may be used between a flow control valve and a meter to block the line of sight of noise travelling with the fluid and also effectively absorb them. This approach, however, may introduce an additional and unwanted pressure drop in the flow.

The disclosed embodiments can offer a solution to these problems by combining noise filtering aspect within the control valve to assist in reducing the noise issue at the source (i.e. flow control valve). This approach can be used to reduce the costs for an expansion sleeve and additional costs for noise reduction parts (e.g., metal foam). The embodiments can be used in bi-directional operation conditions, which is advantageous because most noise reduction installations function well only in one direction. This approach can potentially reduce the need for additional flow conditioners by providing a solution with inbuilt noise reduction, and which can be implemented in, for example, a pipe or between the valve and meter or expansive silencer, which may save additional costs.

FIG. 1 illustrates a side-sectional cut-away view of a flow control valve apparatus 100, in accordance with an embodiment. Note that identical parts or elements are generally indicated by identical reference numerals herein. The flow control valve apparatus 100 includes an actuator 106 disposed above a central body 103, which contains or houses a valve sleeve 102 (not shown in FIG. 2) and an expansion sleeve 108. The central body can house a gear 104, and the valve sleeve 102 and the expansion sleeve 108. The sets of double arrows shown in FIG. 1 indicate that the flow control valve apparatus 100 operates bidirectional fluid flow. That is, the flow control valve apparatus 100 is subject to bidirectional operation.

Figure 2:
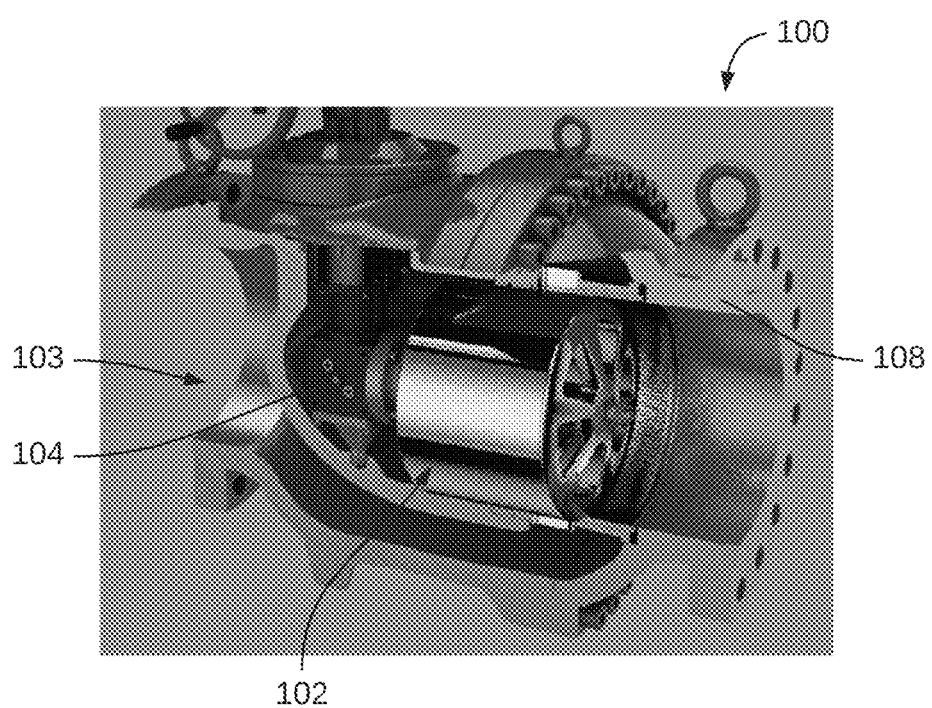
FIG. 2 illustrates a cut-away perspective view of the flow control valve apparatus depicted in FIG. 1, in accordance with an embodiment.

FIG. 2 illustrates a cut-away perspective view of the flow control valve apparatus depicted in FIG. 1, in accordance with an embodiment. The valve sleeve 102 is shown in FIG. 2 with respect to the expansion sleeve 108. The valve sleeve 102 as shown in FIG. 2 can be located to the right of the valve 104 within the central body 103.

Figure 3:
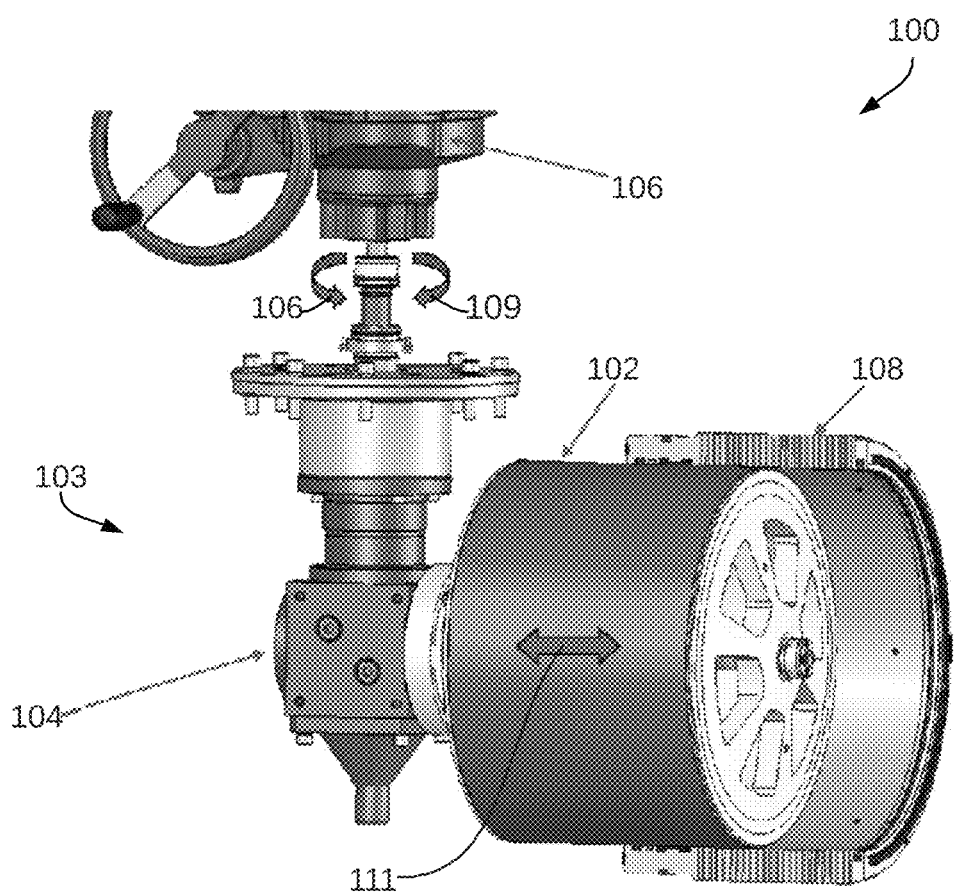
FIG. 3 illustrates an operational view of the flow control valve apparatus depicted in FIG. 1 and FIG. 2, in accordance with an embodiment.

FIG. 3 illustrates an operational view of the flow control valve apparatus 100 depicted in FIG. 1 and FIG. 2, in accordance with an embodiment. The functionality of the flow control valve apparatus 100 is depicted in FIG. 3. For example, arrow 111 shown in FIG. 3 can indicate the bidirectional flow of fluid within the flow control valve apparatus 100. The expansion sleeve 108 is depicted in FIG. 3 as surrounding the valve sleeve 102. Arrows 106 and 109 can indicate a direction of movement of the actuator 106.

Figure 4:
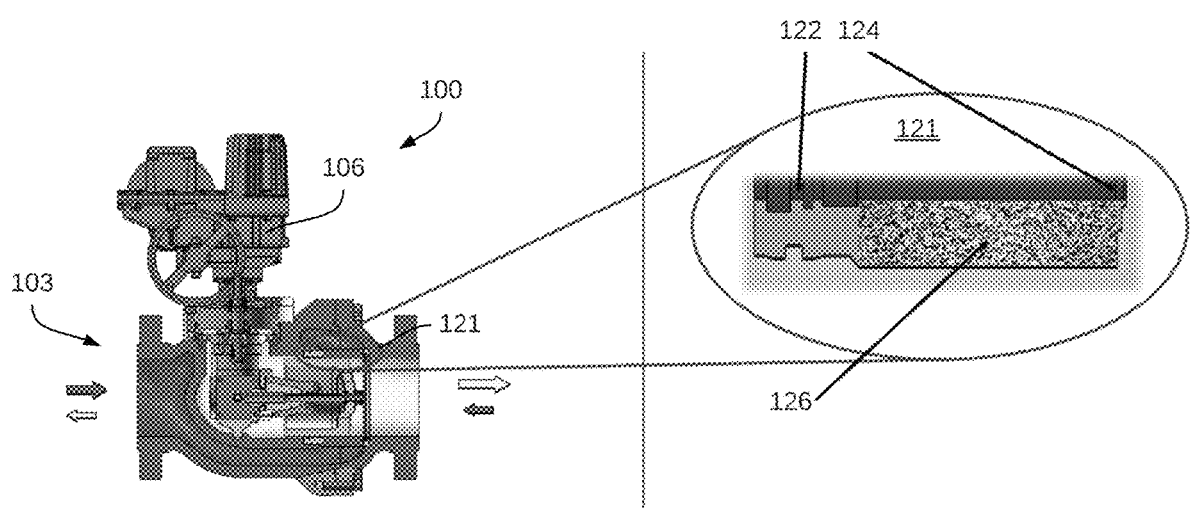
FIG. 4 illustrates a schematic diagram depicting a flow control valve apparatus with an expansion sleeve with noise reduction, in accordance with an embodiment.

FIG. 4 illustrates a schematic diagram depicting the flow control valve apparatus 100 with the expansion sleeve 108 having noise reduction properties, in accordance with an embodiment. The FIG. 4 diagram illustrates the flow control valve apparatus 100 to the left of the larger view of an inset portion 121 that shown at the right side of FIG. 4.

The expansion sleeve 108 can include one or more layers including a layer of standard material such as a material 122 and a material 121, and another layer configured from a material 126 having a scalable volumetric porosity and enhanced noise reduction properties. Aluminum is an example of a material that can be used as material 126. The configuration shown in FIG. 4 can combine noise filtering within the flow control valve apparatus 100, which can help to reduce the noise issues at the source (i.e., valve). By using material such as the material 126 shown in FIG. 4, the expansion sleeve 108 can function as a volumetric expansion sleeve.

Figure 5:
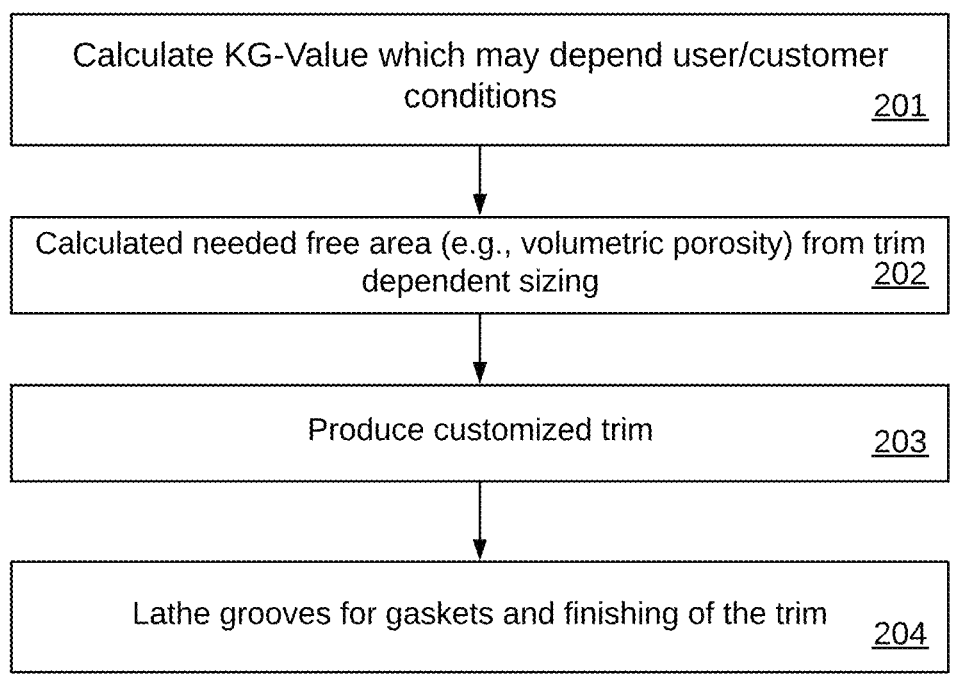
FIG. 5 illustrates a flow chart of operations depicting logical operational steps of a method of configuring a flow control valve apparatus with a volumetric expansion sleeve, in accordance with an example embodiment.

FIG. 5 illustrates a flow chart of operations depicting logical operational steps of a method 200 of configuring a flow control valve apparatus with a volumetric expansion sleeve, in accordance with an example embodiment. As shown at block 201, a step or operation can be implemented to calculate a required KG-Value (i.e., the capacity of the valve) according to user conditions, which may depend on user or customer conditions. Then, as illustrated at block 202, a step or operation can be implemented to calculate the needed free area (e.g., volumetric porosity) from trim dependent sizing. Thereafter, as shown at block 203, a step or operation can be implemented for the production of the customized trim. Finally, as shown at block 204, a step or operation can be implemented to lathe the grooves for gaskets and finishing of the trim.

As utilized herein the term 'trim" can relate to or may refer to an expansive sleeve. The trim is one of the main parts of a valve and responsible for quality of the valve. The term 'KG-Value' refers to a fixed term used in the gas disciplines. An example of 'KG-Value', has been defined in DIN EN 334-3.3.2.6. Note that DIN EN 334 is a European standard for gas pressure regulators. For instance, the KG value is defined in standards DIN EN 334 and DIN EN as—the KG value is equal to a standard flow rate with the flow control valve fully open and the absolute inlet pressure pu=2 bar and the absolute outlet pressure pd=1 bar.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer including, for example, a microcontroller as discussed herein. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments of the invention may be implemented entirely in hardware or in an implementation containing both hardware and software elements. In embodiments that do utilize software, the software may include but is not limited to firmware, resident software, microcode, etc.

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An expansion sleeve apparatus, comprising:
   an expansion sleeve comprising a plurality of layers configured with a first material and at least one layer of the plurality of layers configured from a second material having volumetric porosity and enhanced noise reduction properties, wherein the first material and the second material are different from each other, the volumetric porosity configured based on a KG-value that is calculated according to user conditions, and wherein the KG value is defined based on an absolute inlet pressure and an absolute outlet pressure associated with a flow control valve; and
   the flow control valve, wherein the expansion sleeve surrounds the flow control valve that is configured to facilitate a bidirectional flow of fluid through the flow control valve, and wherein the expansion sleeve is configured to function as a volumetric expansion sleeve using the second material having the volumetric porosity and enhanced noise reduction properties thereby combining noise filtering within the flow control valve;
   an actuator disposed above a central body containing a valve sleeve and the expansion sleeve; and
   a gear housed within the central body, wherein the central body houses the gear, the valve sleeve, and the expansion sleeve.

2. The expansion sleeve apparatus of claim 1 wherein the first material comprises a metal foam.

3. The expansion sleeve apparatus of claim 1 wherein the expansion sleeve is configured with a plurality of grooves.

4. The expansion sleeve apparatus of claim 1 wherein the expansion sleeve is configured based on a determination of a capacity of the flow control valve, wherein the KG-value includes the capacity.

5. The expansion sleeve apparatus of claim 1 wherein the expansion sleeve is configured to operate based on a determination of a capacity of the flow control valve.

6. The expansion sleeve apparatus of claim 1 wherein the expansion sleeve is installed in the flow control valve.

7. A flow control valve apparatus, comprising:
   a flow control valve configured to facilitate a bidirectional flow of fluid through the flow control valve; and
   an expansion sleeve associated with the flow control valve, wherein the expansion sleeve includes a plurality of layers configured with a first material and at least one layer of the plurality of layers configured from a second material having a volumetric porosity and enhanced noise reduction properties, wherein the first material and the second material are different from each other, the volumetric porosity configured based on a KG-value that is calculated according to user conditions, wherein the KG value is defined based on an absolute inlet pressure and an absolute outlet pressure associated with the flow control valve, wherein the expansion sleeve surrounds the flow control valve that is operable with the bidirectional flow of fluid through the flow control valve, and wherein the expansion sleeve is configured to function as a volumetric expansion sleeve using the material having the volumetric porosity and enhanced noise reduction properties thereby combining noise filtering within the flow control valve;
   an actuator disposed above a central body containing a valve sleeve and the expansion sleeve; and a gear housed within the central body, wherein the central body houses the gear, the valve sleeve, and the expansion sleeve.

8. The flow control valve apparatus of claim 7 wherein the first material comprises a metal foam.

9. The flow control valve apparatus of claim 7 wherein the expansion sleeve is configured with a plurality of grooves.

10. The flow control valve apparatus of claim 7 wherein the expansion sleeve is configured based on a determination of a capacity of the flow control valve.

11. The flow control valve apparatus of claim 7 wherein the expansion sleeve is installed in the flow control valve.

12. A method of operating a flow control valve, comprising:

operating a flow control valve with a bidirectional flow of fluid through the flow control valve, the flow control valve associated with an expansion sleeve comprising a plurality of layers configured with a first material and at least one layer of the plurality of layers configured from a second material having a scalable volumetric porosity and enhanced noise reduction properties, wherein the first material and the second material are different from each other, the scalable volumetric porosity configured based on a KG-value that is calculated according to user conditions, wherein the KG value is defined based on an absolute inlet pressure and an absolute outlet pressure associated with the flow control valve, wherein the expansion sleeve surrounds the flow control valve, and wherein the expansion sleeve is configured to function as a volumetric expansion sleeve using the second material having the scalable volumetric porosity and enhanced noise reduction properties thereby combining noise filtering within the flow control valve;

disposing an actuator above a central body containing a valve sleeve and the expansion sleeve; and housing a gear within the central body, wherein the central body houses the gear, the valve sleeve, and the expansion sleeve.

13. The method of claim 12 wherein the first material comprises a metal foam.

14. The method of claim 12 wherein the second material comprises a metal with the scalable volumetric porosity.

15. The method of claim 12 wherein the expansion sleeve is configured with a plurality of grooves.

16. The method of claim 12 wherein the expansion sleeve is configured based on a determination of a capacity of the flow control valve.

17. The method of claim 12 wherein the expansion sleeve is installed in the flow control valve.

* * * * *